United States Patent [19]

Kagita

[11] Patent Number: 5,072,651
[45] Date of Patent: Dec. 17, 1991

[54] DIRECT DRIVE TYPE ROTATION DIVIDING TABLE

[75] Inventor: Kazuhiro Kagita, Tatebayashi, Japan

[73] Assignee: Nippon Seiko Kabushiki Kaisha, Tokyo, Japan

[21] Appl. No.: 668,975

[22] Filed: Mar. 13, 1991

[30] Foreign Application Priority Data

Mar. 19, 1990 [JP] Japan ................................. 2-27895

[51] Int. Cl.⁵ ............................. F01B 7/02; H02K 7/10
[52] U.S. Cl. ........................................... 92/75; 92/107; 310/77; 188/368; 188/369; 188/151 R
[58] Field of Search .................. 92/75, 50, 69, 106, 92/107; 188/151 R, 368, 369, 73.2, 74.2, 71.1; 310/77

[56] References Cited

U.S. PATENT DOCUMENTS

| | | | |
|---|---|---|---|
| 2,621,769 | 12/1952 | Cardwell et al. | 92/75 |
| 2,740,512 | 4/1956 | Fischer | 92/107 |
| 4,295,633 | 10/1981 | Sigmon | 188/72.4 |
| 4,429,618 | 2/1984 | Klute et al. | 92/107 |
| 4,501,980 | 2/1985 | Welburn | 310/12 |
| 4,537,410 | 8/1985 | Hiestand | 92/106 |
| 4,625,837 | 12/1986 | Zimmer | 92/75 |

FOREIGN PATENT DOCUMENTS

1121636 1/1989 Japan .

Primary Examiner—John T. Kwon
Assistant Examiner—Thomas Denion
Attorney, Agent, or Firm—Basile and Hanlon

[57] ABSTRACT

A direct drive type rotation dividing table includes a dividing table mounted on an output shaft of a rotor which is accommodated in a housing together with a stator. A clamp mechanism for maintaining the dividing table at a stopped position includes a cylinder slidably disposed in the housing in an axial direction and having a radially extending plane portion and a friction surface adapted to contact the output shaft, an elastic member having one end connected to the housing and urging the friction surface of the cylinder to move away from the output shaft, and a piston having an elastically deformable thin plane portion opposing the plane portion of the cylinder and having one side fixed to the housing and the other free end slidable on the inner surface of the slider. The piston has a friction surface which is adapted to contact a backside of the dividing table. A pressure chamber is formed between the opposing plane portions of the cylinder and the piston and, when pressurized fluid is supplied to the pressure chamber, the cylinder is moved while sliding to make its friction surface press against the output shaft. At the same time, the thin plane portion of the piston is deflected in the axial direction to make its friction surface press against the backside to the dividing table to clamp the output table and the dividing table.

4 Claims, 2 Drawing Sheets

DIRECT DRIVE TYPE ROTATION DIVIDING TABLE

BACKGROUND OF THE INVENTION

1. Field of the Invention:

The present invention relates to a direct drive type rotation dividing table for positioning by rotating the dividing table by a predetermined angle by a direct driving method without using a reduction gear device and, in particular, to a direct drive type rotation dividing table in which, even when a large load is applied to the table, the table can be securely supported by increasing a clamping force at the time of positioning of the dividing table.

2. Description of the Art:

In a direct drive type rotation dividing table which does not use a reduction gear mechanism, backlash and noise due to a reduction gear are not generated and torsional rigidity can be increased by disposing a clamp mechanism close to a table rotation shaft. Thus, there are advantages in that a torsional deformation of the dividing table shaft can be prevented when a cutting load is applied to a work and machining accuracy can be improved. A prior art direct drive type rotation dividing table of this type, for example, was previously proposed by the inventor of the present application in Japanese Utility Model Laid-open Publication Hei 1-121636. In this rotation dividing table, a motor stator is fixed in a housing and a motor rotor is disposed coaxially with the motor stator. The motor rotor has an output shaft rotatably supported by the housing through a bearing. The dividing table is coupled to the output shaft. Within the housing, there are also provided a rotation detector for detecting a rotation angle of the dividing table and a clamp mechanism for holding the dividing table at a stopped position.

The clamp mechanism includes a clamping member secured to a free end of an elastic body which is fixed to the housing in a cantilever fashion so that the clamping member is brought into contact with or moved away from the output shaft, a cylinder having a plane portion and slidably mounted on the housing for movement in an axial direction, and a piston having a plane portion opposing to the cylinder and movable in the axial direction while sliding in the cylinder.

When the motor stator is energized, the motor rotor and the output shaft are rotated by a predetermined angle to perform a dividing of the dividing table. Thereafter, the dividing table is clamped. At this time, pressurized fluid is supplied to a space between opposing plane portions of the cylinder and the piston of the clamp mechanism so that the cylinder is slidingly moved to strongly pressed the clamping member to the output shaft against the elasticity of the elastic body. At the same time, the piston abuts a backside of the dividing table and applies force in a direction opposite to the direction of the clamping force. By such an arrangement, an unnecessary thrust force is prevented from being applied to the bearing of the output shaft during the clamping operation.

However, in this prior art direct drive type rotation dividing table, a friction surface which contributes to the clamping is only provided on the clamping member, and the pressure of the pressurized fluid contributes only an imparted pressure which is loaded to the cylinder. The pressure loaded to the piston cancels out the thrust force applied to the bearing of the output shaft and does not contribute to the clamping force. As a result, it is difficult to obtain a large clamping force.

Furthermore, a clamping member and a large coil spring or the like to return the piston to the original position is necessary and, thus, the number of parts and costs are increased.

Moreover, since the prior art dividing table is constructed so that the piston is moved while by being supported by a slide guide, the abutting of the upper surface of the piston against the backside of the dividing table and the distribution of the pressing force are not uniform. As a result, another problem is encountered in that a minute inclination of the dividing table is apt to be caused.

SUMMARY OF THE INVENTION

The present invention was made in view of the aforementioned problems in the prior art and it is an object of the invention to provide a direct drive type rotation dividing table which is capable of doubling the clamping force by pressing two surfaces including a dividing table surface and an output shaft surface simultaneously and which requires small number of parts, and which does not cause a minute inclination of the dividing table.

A direct driving type rotation dividing table of the present invention comprises a motor stator fixed to a housing, a motor rotor disposed in the housing opposing and coaxial with the stator, an output shaft extending from the motor rotor in an axial direction and rotatably supported by the housing through a bearing, a dividing table mounted to the output shaft, a rotation detector for detecting the rotation angle of the dividing table, and a clamp mechanism for holding the dividing table at a stopped position. The clamp mechanism includes a cylinder slidably disposed in the housing for movement in an axial direction and having a radially extending plane portion and a friction surface adapted to contact and to move away from the output shaft, an elastic member having one circumferential edge portion fixed to the housing and the other free circumferential edge portion connected to the cylinder to urge the friction surface of the cylinder to move away from the output shaft, a piston disposed opposing to the plane portion of the cylinder and slidingly movable on an inner surface of the cylinder, the piston having a thin plane portion elastically deformable in the axial direction and having one side fixed to the housing in a cantilever fashion and the other free side provided with a friction surface which contacts and moves away from the backside of the dividing table, a pressure chamber provided between the opposing plane portions of the cylinder and the piston, and a fluid path for supplying pressurized fluid to the pressure chamber.

In operation after the rotor is rotated by a predetermined angle and the division is completed, in order to clamp the dividing table, pressurized fluid, such as pressurized air or hydraulic oil, is supplied to the pressure chamber of the clamp mechanism through the fluid path. The cylinder is moved due to such pressure while sliding against the elastic bias of the elastic member and the friction surface of the cylinder is strongly pressed to the output shaft so that the rotation of the output shaft is braked. At the same time, the thin plane portion of the piston is deflected in the axial direction opposite to the cylinder and the friction surface of the free end of the piston is strongly pressed against the backside of the dividing table. As a result, the dividing table is also strongly braked. In this manner, large resistances are respectively applied to the backside of the dividing table and to the output shaft such that the clamping force is doubled.

Furthermore, a clamping member and a large coil spring for returning the piston to its original position are not necessary so that the number of parts is small and thus, inexpensive.

Since the piston has large rigidity in a radial direction and, further, since it operates by the elastic deformation of the thin plane portion which deflects in the axial direction, the contact pressure of the upper surface of the piston applied to the backside of the dividing table is uniform and the phenomenon of causing a minute inclination of the dividing table can be prevented.

DESCRIPTION OF THE PREFERRED EMBODIMENT

Figure 1:
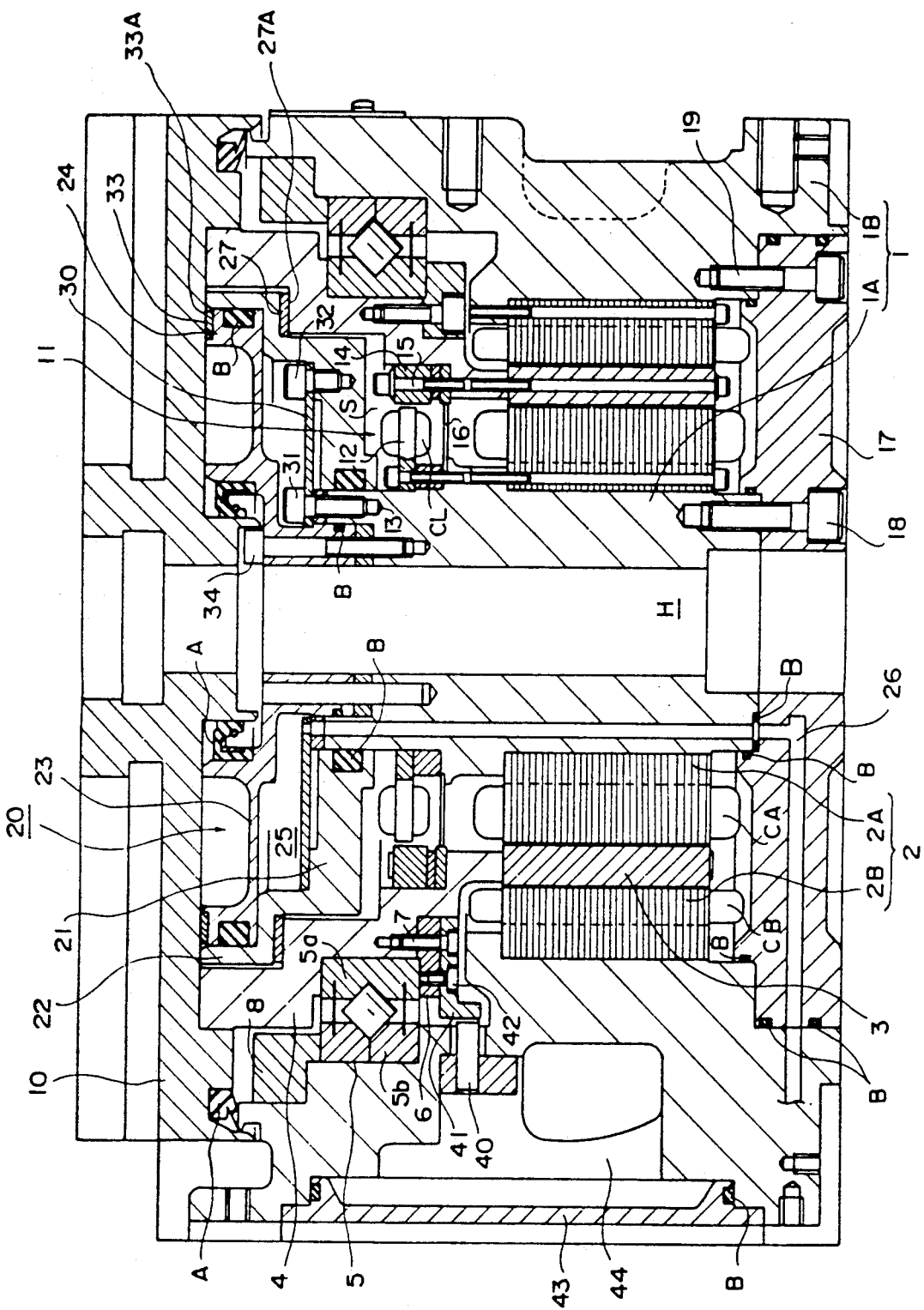
FIG. 1 is a longitudinal cross sectional view of a direct drive type rotation dividing table of one embodiment of the present invention.
Figure 2:
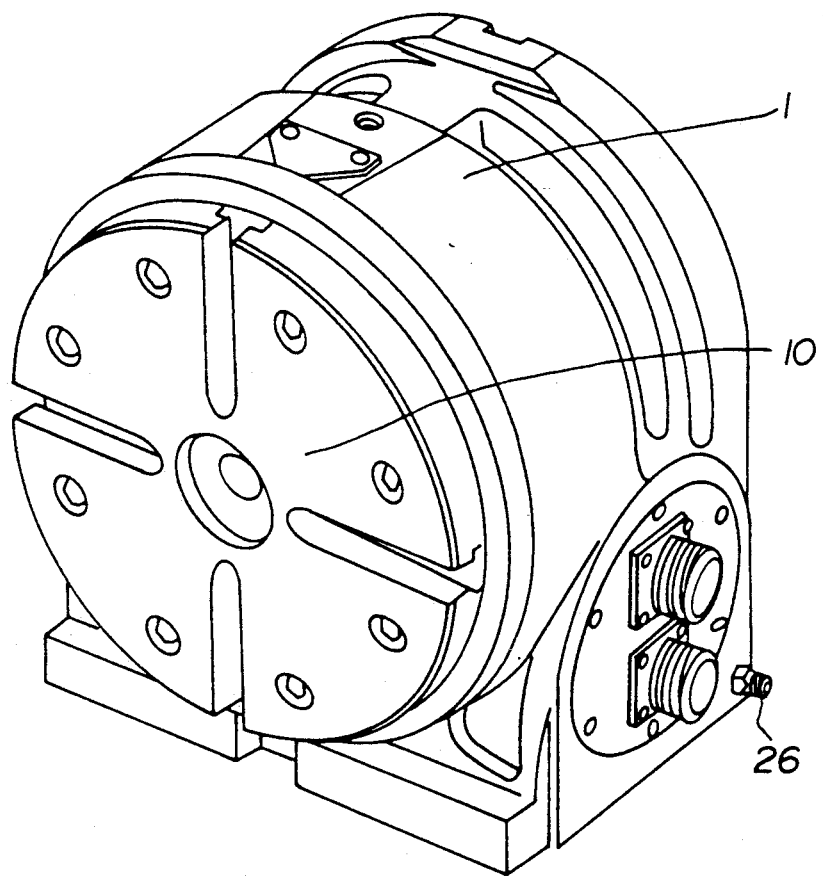
FIG. 2 is a perspective view of the rotation dividing table shown in FIG. 1.

With reference to FIGS. 1 and 2, a housing 1 is of a cylindrical shape and has an axial bore H at its center. Within the housing 1, there is provided a motor having a structure in which the tooth lines or slots of an electromagnet of a motor stator 2 oppose the tooth lines or slots of an iron core of a motor rotor 3. The motor stator 2 includes a plurality of pole pieces each having a plurality of tooth lines or slots and, by sequentially energizing the pole pieces, the motor rotor 3 is rotated. In the motor stator 2, the phase of each pole piece is different from that of another pole piece.

Specifically, a motor inner stator 2A having a coil CA is press fitted into an outer peripheral portion of a housing inner cylinder 1A. A motor outer stator 2B having a coil CB is press fitted into an inner peripheral portion of a housing outer cylinder 1B so that the motor outer stator 2B faces the motor inner stator 2A. The motor rotor 3 having the same pitch is rotatably accommodated between the motor inner stator 2A and the outer stator 2B and the rotor 3 is exerted with rotation torque at both the inner side and the outer side. An output shaft 4 of an annular shape is formed at one end of the motor rotor 3 and extends axially therefrom. An inner race 5A of a cross roller bearing 5 is fitted about an outer peripheral surface of an intermediate portion of the output shaft 4 and fixed by a fixing member 6 which is clamped by a fixing bolt 7. Furthermore, an outer race 5B of the bearing 5 is fitted into an inner peripheral surface of the housing outer cylinder 1B and fixed by an annular bearing presser 8 which is secured to an upper end surface of the housing outer cylinder 1B by a bolt (not shown).

A dividing table 10 is secured to an upper surface of the output shaft 4 by a bolt (not shown).

Below the dividing table 10 and within a space S, there is a resolver 11 which acts as a high resolution rotation detector for positioning the motor with high accuracy. The space S is surrounded by the housing inner cylinder 1A and the output shaft 4 and is located above the motor inner stator 2A. A stator 12 of the resolver 11 having a coil CL is secured to an inner peripheral surface of the housing inner cylinder 1A by a bolt. On the other hand, a rotor 14 of the resolver 11 is fixed to a step portion of the output shaft 4 opposing the stator 12. The stator 12 of the resolver 11 has tooth lines or slots similar to that of the motor inner stator 2A and coils CL respectively wound about magnetic poles. The rotor 14 of the resolver 11 has tooth lines or slots of the same pitch as the motor rotor 3.

When the motor rotor 3 is rotated, the rotor 14 of the resolver 11 is also rotated and, thus, reluctance with respect to the tooth lines or slots of the stator 12 is changed. A signal representative of this reluctance change is digitized by a resolver control circuit of a drive unit (not shown) and the digitized signal is utilized as a position signal which detects a rotation angle of the rotor 14 and, in turn, a rotational position of the output shaft 4. The reference numeral 16 designates a magnetic shielding plate which interposed between the motor inner stator 2A and the stator 12 of the resolver 11.

A housing base 17 is fixed to a lower end side of the housing inner cylinder 1A and the housing outer cylinder 1B by fixing bolts 18 and 19.

A clamp mechanism 20 is mounted above the space S in which the resolver 11 is accommodated. The clamp mechanism 20 includes a cup-shaped cylinder 22 having a radially extending plane portion 21, a piston 24 slidable on an inner surface of the cylinder 22 and having a thin plane portion 23 which faces the plane portion 21 forming a bottom surface of the cylinder 22, extends radially to form a disk shape with an aperture at its center and is elastically deformable, a pressurized chamber formed between the plane portion 21 of the cylinder and the plane portion 23 of the piston, and a fluid path 26 for supplying pressurized fluid, for example, compressed air or pressurized oil, to the pressure chamber 25.

The cylinder 22 is fitted into the inner peripheral surface of the housing inner cylinder 1A and is slidable in the axial direction. An outer peripheral end portion thereof rises in a cylindrical shape and extends radially. A friction member 27 is bonded to a lower end surface (backside) of the extending and cylindrically rising outer peripheral end portion. A friction surface 27A of the friction member 27 faces an upper surface of the step portion of the output shaft 4. An inner peripheral edge side of an elastic member 30 made of a spring steel and having a doughnut plate shape is fixed to the upper end surface of the housing inner cylinder 1A by a bolt (in a cantilever fashion when viewed in a longitudinal sectional plane). An outer peripheral edge side (free end) of the elastic member 30 is held to a step surface of the cylinder 22 by a bolt 32 so that the friction surface 27A of the friction member 27 is urged in a direction to move away from the output shaft 4.

On the other hand, the cylinder 24 is similar to the cylinder 22 and has its outer peripheral end portion rising in a cylindrical shape. The rising portion is fitted into an inner peripheral surface of the rising portion of the cylinder 22 and movable in the axial direction. An inner peripheral edge portion of the piston 24 is fixed to an upper end surface of the housing inner cylinder 1A by a bolt 34. A friction member 33 is bonded to an upper end surface of the outer peripheral rising portion of the piston 24 and its friction surface 33A faces the backside of the dividing table 10 with a gap therebetween.

A fluid path 26 for feeding pressurized fluid to the pressure chamber 25 at the time of clamping the dividing table is formed, in this embodiment, to communicate the outside of the housing outer cylinder 1B to the pressure chamber 25 through the housing base 17 and the housing inner cylinder 1A.

The reference letter A designates a rotation seal member, such as an oil seal, and the letter B designates the sliding portion and the stationary portion seal member, such as an O ring. Further, reference number 40 designates a proximity switch which acts as an original sensor for detecting a reference point at the time of detecting a rotational position of the dividing table 10. Reference number 41 designates a metal piece which is fixed by a screw 42 at a specified position opposable to the origin detecting sensor 40.

Reference number 43 designates a cover member which seals the coils CA and CB of the motor stator, the stator coil CL of the resolver 11, and an electrical connection portion 44 of the origin detecting sensor 40.

Next, the operation of the present invention will be described.

Motor current is supplied to the coils CA and CB of the motor inner stator 2A and the motor outer stator 2B through a drive unit (not shown). The tooth lines or slots of the motor stator 2 are excited in a predetermined sequence such that the motor rotor 3 is rotated. When the motor rotor 3 is rotated, the rotor 14 of the resolver 11 is also rotated and, as a result, the reluctance with respect to the tooth lines or slots of the stator 12 of the resolver 11 is changed. This change is digitized by a resolver control circuit of the drive unit (not shown) and the digitized signal is utilized as a position signal so that a rotational angle of the rotor 14, that is, a rotational angle of the output shaft 4 is restricted to index the dividing table 10. In this case, since the motor stator 2 exists at the inside and the outside of the motor rotor 3, a high torque is obtained.

After the indexing is completed, the dividing table 10 is clamped by the clamp mechanism 20. In this case, compressed air (or hydraulic pressure) is supplied to the pressure chamber 25 through the fluid path 26. By this pressure, the cylinder 22 is pressed to a direction opposite to the dividing table 10 against the biasing of the elastic member 30 and the cylinder 22 is moved downwardly by a minute distance in the orientation of FIG. 1. As a result, the friction surface 27A of the friction member 27 abuts against the step portion of the output shaft 4 and presses strongly in the direction of the thrust. Thus, the rotating movement of the output shaft 4, that is, of the dividing table 10, is prevented. At the same time, the thin plane portion 23 of the piston 24 is pressured in a direction opposite to the cylinder 22, that is, towards the dividing table 10. Then, the thin plane portion 23 is elastically deformed and the outer peripheral side of the piston 24 is moved upwardly a slight distance in the FIG. 1. The friction surface 33A of the friction member 33 located at the upper surface of the piston 24 is pressed against the backside of the dividing table 10 to thereby prevent rotation of the dividing table 10. Accordingly, the clamping force which is doubled as compared with that in the prior art is applied to the dividing table 10. Furthermore, a reaction force against the force in the direction of the thrust by the cylinder 22 is applied to the output shaft 4 and, thus, a thrust displacement force of the dividing table 10 is canceled out. Consequently, an unnecessary thrust force is prevented from being applied to the bearing 5 of the output shaft 4.

When the piston 24 is to return to an unclamped position, the piston 24 can return by itself due to an elastic restoration force of the plane portion 23. Furthermore, the movement of the piston 24 is not a sliding movement of the whole piston 24 as in the prior art. Rather, it is a deflection movement of the plane portion 23. Accordingly, the contact pressure of the friction surface 33A of the piston 24 against the backside of the dividing table 10 becomes uniform. As a result, the slanting of the dividing table 10 at the time of clamping is prevented.

While it is described in the above embodiment that the high torque type motor has motor stators 2A and 2B disposed at both outer and inner sides of the motor rotor 3, the present invention is not limited to this and a motor having a single motor stator and a single motor rotor may be assembled together with the clamp mechanism 20.

In the present invention, as described in the foregoing, in a direct driving type rotation dividing apparatus which contains a step motor and a resolver therein, a clamp mechanism comprises a cylinder having a friction surface which contacts and moves away from an output shaft and a piston elastically deformable in an axial direction and having a friction surface which contacts and moves away from a backside of a dividing table. Accordingly, at the time of change-over between clamping and unclamping, since the dividing table is not displaced in the axial direction, the dividing can be achieved in a short time. Further, since the dividing table having a predetermined weight is not required to move up and down, the bearing of the output shaft is not loaded with an unnecessary inertial thrust. Further, since the clamp mechanism is provided at a position close to the supporting bearing of the dividing table, the rigidity of the supporting member of the dividing table is large and a rotation dividing apparatus with high accuracy can be provided.

What is claimed is:

1. In a direct drive type rotation dividing table having a motor stator fixed to a housing, a motor rotor disposed in the housing opposing and coaxial with the stator, an output shaft extending from the motor rotor in an axial direction and rotatably supported by the housing through a bearing, a dividing table mounted to the output shaft, and a clamp mechanism for holding the dividing table at a stopped position, the improvement comprising:

the clamp mechanism including:
a cylinder slidably disposed in the housing for movement in an axial direction and having a radially extending plane portion and a friction surface adapted to contact and to move away from the output shaft;
an elastic member having one circumferential edge portion fixed to the housing and the other free circumferential edge portion connected to the cylinder to urge the friction surface of the cylinder away from the output shaft;
a piston disposed opposing to the plane portion of the cylinder and slidingly movable on an inner surface of the cylinder, the piston having a thin plane portion elastically deformable in the axial direction and having one circumferential side fixed to the housing and the other free circumferential side provided with a friction surface which contacts and moves away from the backside of the dividing table;
a pressure chamber provided between the opposing plane portions of the cylinder and the piston; and a fluid path for supplying pressurized fluid to the pressure chamber.

2. The improvement in a direct drive type rotation dividing table according to claim 1 further comprising a rotation detector for detecting a rotation angle of the dividing table.

3. The improvement in a direct drive type rotation dividing table according to claim 1 wherein the elastic member is of a doughnut plate-shaped spring steel.

4. The improvement in a direct drive type rotation dividing table according to claim 1 wherein the thin plane portion of the piston has a disk shape with an aperture at the center thereof.

* * * * *